July 19, 1960 J. B. CLARK ET AL 2,945,917
ARRANGEMENTS FOR CONTROLLING THE ACCESS OF A NUMBER OF EQUIPMENTS TO A COMMON APPARATUS
Filed March 17, 1958
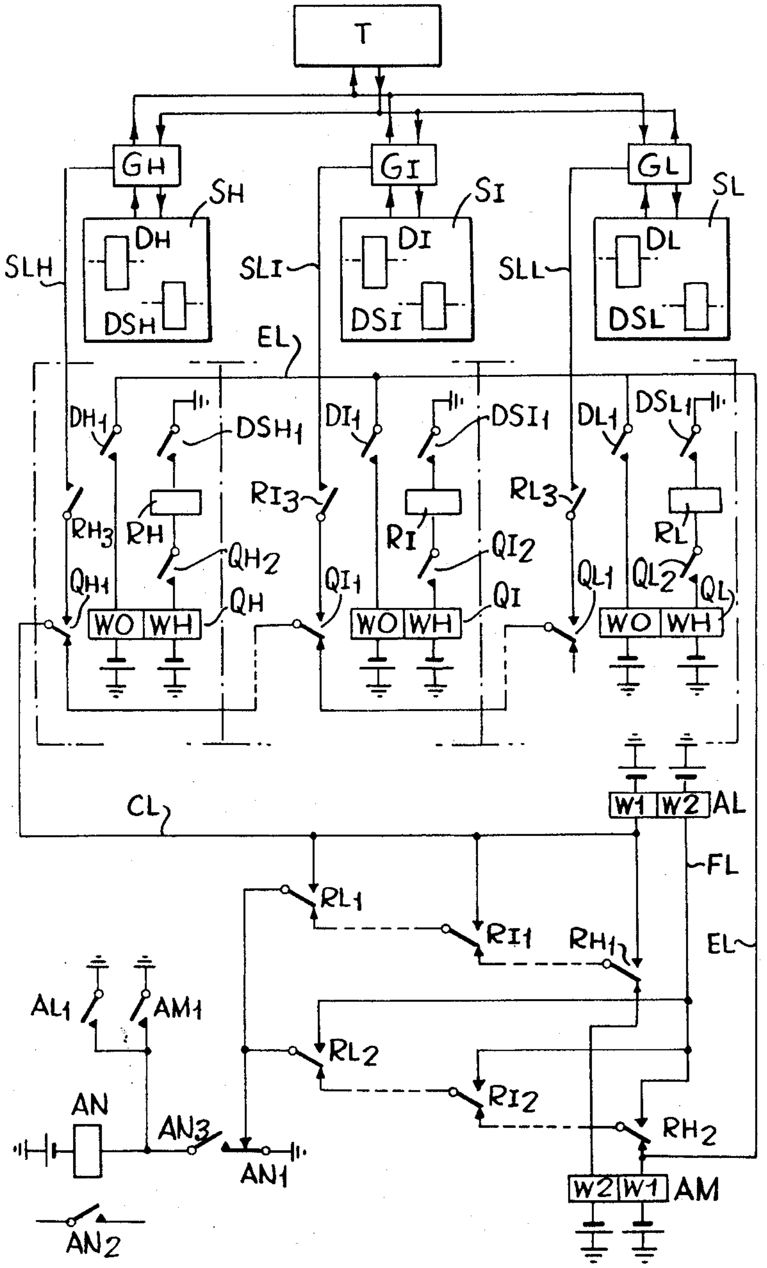
INVENTORS
JOHN BROWNLIE CLARK
PERCY WILLIAM HICKS
BY *Larson and Taylor*
ATTORNEYS United States Patent Office 2,945,917

Patented July 19, 1960

2,945,917

ARRANGEMENTS FOR CONTROLLING THE ACCESS OF A NUMBER OF EQUIPMENTS TO A COMMON APPARATUS

John Brownlie Clark, Bexleyheath, and Percy William Hicks, Wilmington, near Dartford, England, assignors to Siemens Edison Swan Limited, London, England, a British company Filed Mar. 17, 1958, Ser. No. 722,081

Claims priority, application Great Britain Mar. 26, 1957

9 Claims. (Cl. 179—27)

This invention relates to an arrangement for controlling the access of a number of equipments one at a time, in batches, to a common apparatus; that is, all the equipments constituting one batch are given access to the common apparatus in turn and prior to equipments constituting another batch.

An important but non-exclusive application of the invention is in connection with telephone exchange systems for avoiding so-called "unfortunate demands" as may occur during periods of congestion. Thus in an automatic exchange employing a common translator for a number of register-senders, it may happen that if there is arbitrary selection of which register gets the services of the translator from several awaiting attention, one of the waiting registers may be unfortunate in its efforts to seize the translator with the result that the call for which that register is being used is unduly delayed. A similar state of affairs may arise on manual switchboards in respect of calls awaiting attention by an operator, especially in the case of cord type switchboards where call queuing arrangements, not unduly difficult or complicated for cordless switchboards, tend to be somewhat difficult to apply.

The present invention seeks, inter alia, to provide a solution applicable to such "unfortunate demand" problems in telephone exchanges, doing so by taking the demands existing at any instant as a batch and dealing with all these demands in turn before proceeding with another batch.

With this end in view, therefore, the invention broadly provides, in general terms, an arrangement for controlling the access of a number of equipments one at a time, in batches, to a common apparatus, which arrangement comprises means associated individually with each of said equipments for indicating a demand by the equipment for access to the common apparatus, means for individually storing such demands from those equipments (one or more) that are awaiting access at a given instant, which equipments constitute a batch, means responsive to the presence of any stored demand and effective, after a delay sufficient for operation of the slowest responding storage means, to inhibit the operation of the storage means for the other equipments not included in said batch, means governed by the stored demands for establishing access between the common apparatus and the equipments of a batch one at a time in a predetermined order of priority, and means effective to clear out the stored demands after they have been met and to cause removal of the inhibition on the storage means after all the equipments of the batch have had access.

In this way, equipments waiting together for access to the common apparatus are taken as a batch by having their demands for access stored, and the storage means for the other equipments are then rendered incapable of accepting subsequently made demands. The equipments in the batch are thereafter given access to the common apparatus one by one, after which, with the originally stored demands cleared out and with the storage means again rendered capable, by removal of the inhibition, of accepting new demands, the process is repeated for any equipments which in the meantime may have demanded access and are then awaiting such access as another batch. As will be appreciated, the average delay between an equipment demanding and getting access to the common apparatus is thus limited to the average period for dealing with one batch.

In carrying out the invention, the one-at-a-time access to the common apparatus of the equipments in a batch may be achieved under the control of means which, when the storage means for any particular equipment in a batch has an unsatisfied demand for access stored therein and the demands of any equipments of higher priority in the batch have been met, is effective to apply a control signal to that particular equipment for establishing access thereof to the common apparatus for a requisite time and thereafter to extend the control signal towards any equipments of lower priority in the batch, the control signal being preferably made available only in response to the presence of at least one stored and unsatisfied demand.

Thus it is contemplated that there may be provided for each of the equipments, a bi-stable storage means which can be changed from an initial condition to an operated condition as a result of the related equipment operating a "demand" contact to indicate that it wants access to the common apparatus, together with two further contacts operated consequentially on such change of the storage means, the one to render the demand contacts for all the storage means thereafter ineffectual while the other, having a series connection extended to it from a marked control lead through the corresponding contacts, when unoperated, for the equipments of higher priority, operates to apply the control lead marking to the related equipment as a signal for establishing access between that equipment and the common apparatus, the storage means and its consequentially operated contacts being restored to their unoperated condition, as by the operation of a "demand satisfied" contact, when the equipment has finished with the common apparatus; each storage means for the several equipments may also have associated with it yet other consequentially operated contacts co-operating with each other to mark the control lead only when at least one of the storage means is in its operated condition.

These storage means just referred to may take any convenient form and may each be constituted, for instance, by a bi-stable trigger circuit or a grid-controlled gaseous discharge tube triggered on its grid and extinguished by removal of its anode potential (in which cases the consequentially operated contacts may be on relays energised from the trigger circuit or discharge tube). Alternatively, as is preferred, each storage means may be constituted by some form of self-holding or stick relay, namely one which when energised to an operated condition remains in this condition, irrespective of removal of the original energisation, until subsequent interruption of a holding circuit or energisation of a driving down circuit.

In order that the invention may be more readily understood, reference will now be made to the accompanying drawing the single figure of which illustrates, partly by conventional symbols and partly in block form, a particular embodiment of the invention illustrated for three equipments (assumed to be telephone register-senders) which are served by a common apparatus, assumed to be a translator.

Referring to the drawing, the embodiment illustrated theerin employs, as the bi-stable storage means referred to above, respective stick relays, Q, each having a pick-up winding WO, which is initially energised to pick up the relay, and a hold-on winding WH which is connected in a hold-on circuit including a contact Q2 which the relay closes on being picked up; the hold-on circuit of each stick relay Q also includes a normally closed "demand satisfied" contact DS, together with the winding of a repeater relay R connected either in series (as shown) or parallel with the hold-on winding of the stick relay Q. These relays and contacts are given a suffix H, I or L according to the relative priorities of the particular equipments to which they relate, as will be explained.

A demand storage circuit SC including such a stick relay Q with the winding of a repeater relay R in its hold-on circuit, is provided for each of several equipments $S_H$ . . . $S_I$ . . . $S_L$, served by a common apparatus T. These equipments S, which, like the common apparatus T are represented only in block form, are assumed, for the purposes of the description, to be respective automatic telephone exchange senders served by a common translator. Only three equipments are represented in the drawing but it will be understood that usually there will be a considerably greater number than this. The equipments are given a certain order of priority: the suffix H relates to the equipment having highest priority of the three represented, L to the equipment of lowest priority, and I to the equipment having priority intermediate the other two.

Each sender S, when requiring the services of the translator, operates a demand relay D. This closes a demand contact D1 in the pick-up circuit of the corresponding stick relay Q and thereby connects the pick-up winding of this stick relay in series with a source of energisation (shown as a battery B) between earth and a lead EL common to all storage circuits; this common lead EL is itself connected to earth through serially connected back contacts $R_H$2, $R_I$2, $R_L$2 . . . of all the repeater relays R and a normally-closed contact AN1 of an alarm relay AN the operation and function of which will be described later. Assume that initially all the stick relays Q and their repeater relays R are in an unoperated condition and that in a period of congestion more than one sender S requires the services of the translator T at the same time. These senders close their demand contacts D1 and thereby complete the energising circuits for the pick-up windings WO of their respective stick relays Q, which thereupon close their hold-on contacts O2 to energise their hold-on windings WH and also the windings of the respective repeater relays R. These repeater relays R then open their back contacts R2 to disconnect the common lead EL from earth, thus preventing subsequent closure of a demand contact D1 from completing a pick-up circuit for the associated stick relay Q. Those senders S which simultaneously required access to the translator are thus accepted as a batch, to the exclusion of senders subsequently demanding access. To ensure operation of the stick relays Q for all the senders of a batch, it is arranged that the fastest operating repeater relay R is sufficiently slow for the slowest of the stick relays Q to have picked up before its pick-up circuit is broken at a repeater relay back contact R2.

The stick relays Q have respective switching contacts Q1 which in their back positions (relay not picked up) set up a series connection extending from a control lead CL through these contacts Q1 in the order: $Q_H$1, $Q_I$1, $O_L$1 according to the relative priority of the senders $S_H$ . . . $S_I$ . . . $S_L$ with which they are associated. Thus as is clear from the drawing, the switching contacts $Q_H$1 and $Q_L$1, which belong to the stick relays $Q_H$ and $Q_L$ associated with the senders $S_H$ and $S_L$ having the highest and lowest priority, are included in the said series connection at positions which, electrically, are respectively nearest to and furthest from the control lead CL, while the switching contact such as $Q_I$1 relating to any sender of intermediate priority is included in the series connection at an appropriate intermediate position. In their front positions (relay picked up) the switching contacts Q1 interrupt their series connection and establish connections to individual signal leads SL for the senders in such manner that, in respect of any particular sender, a connection is extended to its signal lead SL from the control lead CL when the related Q1 switching contact is in its front position and the corresponding swtiching contacts for all senders of higher priority are in their back positions. Thus taking the lowest priority sender $S_L$ by way of example, a connection to its signal lead $SL_L$ from the control lead CL is only established when the switching contact $Q_L$1 is in its front position and the contacts such as $Q_H$1 and $Q_I$1 associated with all the senders of higher priority are in their back positions. Consequently on operation of the stick relays Q associated with a batch of senders which simultaneously demanded access, the control lead CL is initially connected to the signal lead SL of the sender having the highest priority in the batch. Contacts R3 of the repeater relays R may (as shown) be included in the connections to the respective signal leads SL for a purpose to be explained later.

Further contacts R1 on the respective repeater relays R are serially connected in their back positions in the order of priority of the senders S to which they relate, and the contact $R_L$1 of the repeater relay $R_L$ for the sender $S_L$ of lowest priority is connected to earth through the previously mentioned normally-closed contact AN1 of the alarm relay AN. On operation of any of these repeater relay contacts R1, to the front position, the series connection through them is broken and a connection is established to the control lead CL such that earth is applied to it as a marking potential. This latter connection extends from the control lead to earth by way of the front position of the R1 contact on the repeater relay R associated with the sender of lowest priority in the batch, the back position of the corresponding contact on the repeater relay associated with any sender of lower priority not in the batch and the normally closed contact AN1 of relay AN. For instance if senders $S_H$ and $S_I$, but not $S_L$, are included in a batch, earth is initially connected to the control lead CL over contact AN1, contact $R_L$1 in its back position and contact $R_I$1 in its front position.

A marking signal thus applied to the control lead CL is extended to the signal lead SL of the sender of highest priority in the batch over the switching contact Q1 of the related stick relay Q as previously described, indicating that this sender may now be coupled to the translator. Such a marking signal appearing on a signal lead SL may, for instance, open a gating circuit represented in block form at G, through which the relevant sender S becomes coupled to the common translator T.

When the sender of highest priority in a batch has satisfied its demands on the translator, it operates its "demand satisfied" relay DS to open contact DS1 in the holding circuit of the associated stick relay Q, thus releasing this relay Q and its repeater R. The switching contact Q1 of this stick relay thereupon breaks the connection made to the signal lead SL in its front position, and in its back position extends the earth marking of the control lead CL to the next signal lead SL to which connection has been established by a stick relay contact Q1 in its front position, that is, to the signal lead SL for the sender of next lowest priority in the batch. This next sender is then coupled to the translator and when finished with it operates its "demand satisfied" contact DS1 to release its stick and repeater relays Q and R, whereafter the process is continued in order of priority for any other senders in the batch.

When all the senders S have been dealt with and the last repeater relay R has been released, the earth marking is removed from the control lead by the contact R1 of this last repeater relay returning to its back position, and earth is again connected over the back positions of the repeater relay contacts R2 to the common lead EL in the pick-up circuits for the stick relays Q. Consequently operation then takes place of the stick relays of any senders which, during the time that the first batch of senders was being dealt with, had requested access to the translator by closing their "demand" contacts D1, the whole process being repeated for this new batch of senders.

It will be appreciated that the arrangement described operates as a kind of batching gate which accepts those senders which are awaiting access to the translator at a given instant and is then closed to any senders subsequently demanding access until the first batch has been attended to. By achieving the gating action of relays Q, R individual to the senders, a serious disadvantage of having a common gating relay operating once per gate closure is obviated. Instead, relay operation is limited to once every time the associated sender uses the translator, which is particularly important in reducing relay wear where a very large number of gate operations can be expected.

It is important, particularly for a telephone exchange, that faults which may occur in the gating arrangement should be quickly detected, since the occurrence of such faults could result in paralysis of the exchange. In the embodiment of the invention just described, with reference to the drawing the faults most necessary to be detected quickly are earth faults either on the control lead CL or on the common lead EL in the pick-up circuits for the stick relays Q. An earth fault on the common lead EL would allow operation of the stick relay Q of any sender which makes a demand for access subsequently to closure of the gate. If this relay belonged to a sender of higher priority than the one currently being dealt with by the translator (a condition which must ultimately occur), this latter sender will be cut off and the newly arrived one immediately coupled, thereby disrupting the exchange working. A fault on the control lead CL would mean that, as soon as a stick relay Q operated, the sender to which it relates would receive a signal over the relevant lead SL to couple it to the translator. Since the stick relay Q for a sender of relatively low priority could easily operate before another, such other stick relay, when it operates, would cut off the effect of the first, with results similar to those of an earth fault on the common lead. This danger may be minimised by ensuring suitable relative operating times for the stick and repeater relays as indicated above.

In the embodiment described above, detection of the earth faults indicated may be effected as follows: Each of two fault detection relays AM and AL has two windings W1 and W2 connected differentially so as to operate when one of the windings, but not both, is energised. One side of each winding is connected through a source of energisation to earth, so that the winding will be energised on application of earth to its other side. In the fault detecting relay AM the winding W1 is connected on this other side to the common lead EL and the winding W2 is connected to earth through the normally-closed contact AN1 of the alarm relay AN and the back-position series connection of the repeater relay contacts R1 which govern the application of earth to the control lead CL. If the circuit is functioning correctly, earth will either be applied to both windings of the fault detecting relay AM or will be removed from them by the operated repeater relays R, with the result that this fault detection relay will not operate. If, however, there is an earth fault on the common lead EL, then the operation of one or more of the repeater relays R, which should remove earth from this lead at the R2 contacts, will fail to do so and the fault relay will operate because its winding W1 will remain energised whereas its winding W2 is de-energised at the R1 contacts. Operation of this relay AM closes a contact AM1 in the energising circuit of the alarm relay AN, which in turn may close contacts AN2 to operate some form of visible or audible alarm (not shown), while at the same time closing a hold-on circuit for itself through a front contact AN3 which is arranged to close before the previously mentioned back contact AN1 of this relay opens. The opening of this back contact AN1 removes earth from the control lead CL and prevents coupling of the senders to the translators.

Should there be a dirty contact in the series connection of repeater relay back contacts R2 through which earth is normally applied to the common lead EL, release of the repeater relays R when all the senders of a batch have been dealt with may fail to re-establish earth on the common lead EL. Assuming that the other back contacts R1 on the repeater relays R function properly, the fault detection relay AM will have earth applied, through these latter back contacts R1, to only one of its windings, resulting in operation of the alarm relay AN as before.

The second fault detecting relay AL has its windings connected, on their opposite sides from the energising source, the one (W1) to the control lead CL and the other (W2) to a fault circuit lead FL to which earth is applied through the normally-closed back contact AN1 of the alarm relay AN when any one or more of the repeater relays R is operated. For this purpose, the repeater relay contacts R2 are each arranged, on being operated to the front position, to interrupt the series connection through the back positions of these contacts and to establish a connection to the fault circuit lead FL, doing so in such manner that earth is applied to this latter lead by the operated repeater relay R associated with the sender of lowest priority in a batch. For example if senders $S_H$, $S_I$ and $S_L$ were all included in the one batch earth would be applied to lead FL by contact $R_L2$ in its front position: if, however, only senders $S_H$ and $S_I$ were in the batch, lead FL would receive earth over contact $R_I2$ in its front position via contact $R_L2$ in its back position. In normal conditions earth is applied to or removed from both windings of this fault detecting relay AL together, so that the relay remains unoperated. With an earth fault on the control lead CL, however, deenergisation of the last of the operated repeater relays R, which should remove earth from the control lead CL, will fail to do so and the winding W1 of the fault detecting relay AL will therefore remain energised, resulting in operation of this relay to establish at contact AL1 an energising circuit for the alarm relay AN. The alarm relay functions as before and its back contact AN1 removes earth from the common lead EL in the pick-up circuits of the stick relay Q, thus preventing pick-up of these relays even though a new batch of senders may be awaiting attention.

If, while dealing with a batch of senders, earth is lost on the control lead CL as a result of dirt on one or more of the repeater relay contacts R1, then the fault detecting relay AL becomes energised in winding W2 only and operates to energise the alarm relay AN as before.

A fault arising in the fault detecting circuit due to faulty front contact operation of the repeater relay contacts R2, or due to faulty back contact operation of the repeater relay contacts R1, will also be detected by the fault detecting relay AL or AM respectively.

It may be noted that the fault detecting relays AL and AM and the alarm relay AN operate only when a fault condition occurs, thus minimising operation of these relays and so prolonging their lives.

In the illustrated embodiment of the invention the optional repeater relay contacts R3 may be included to obviate the possibility of a fleeting earth condition being applied to a signal lead SL should a Q relay associated with a sender of higher priority be energised consequent on the related demand contact D1 being closed in the (brief) interval between the pick-up of the Q relay for a lower priority sender and the removal of earth from the common lead EL by the R2 contact of the repeater relay of the last mentioned Q relay. For instance, if a batch of senders about to be dealt with included the sender $S_I$ but not the sender $S_H$, there would be the possibility that the sender $S_H$ might close its demand contact $D_H$1 after relay $Q_I$ had been picked up over the closed contact $D_I$1 but before the repeater relay $R_I$ had had time to pick up and remove earth from the lead EL to close the batching gate. The sender $S_H$ would then be included in the batch but its stick relay $Q_H$ would be late in operating, with the result that the signal lead $SL_I$ for the sender $S_I$ could receive a fleeting earth marking in the interval between the changing of contact $Q_I$1 to its front position and the subsequent changing of contact $Q_H$1 to its front position. The presence of the contact $R_I$3 would prevent this happening by preventing the signal lead $SL_I$ from receiving any marking until after the relay $R_I$ had operated to close the batching gate.

What we claim is:

1. In an arrangement for controlling the access of a number of equipments one at a time, in batches, to a common apparatus, demand means associated individually with each of said equipments and operable to indicate a demand by the equipment for access to the common apparatus, storage means individually operable by the operated demand means for storing such demands from those equipments that are awaiting access at a given instant, which equipments constitute a batch, inhibiting means effective, in response to the operated condition of any storage means and after a delay sufficient for operation of the slowest responding storage means, to inhibit the operation of the storage means for the other equipments not included in said batch, means governed by the operated storage means for establishing access between the common apparatus and the equipments of a batch one at a time in a predetermined order of priority, and further means effective to restore the storage means to their normal conditions after their stored demands have been met, thereby to cause removal of the inhibition on the storage means after all the equipments of the batch have had access to the common apparatus.

2. An arrangement as claimed in claim 1 wherein said means for establishing one-at-a-time access to the common apparatus includes in respect of each said equipment, switching means operable on operation of the storage means of that particular equipment and effective when so operated, provided that the storage means of any equipments of higher priority in the batch are normal, to apply to said particular equipment a control signal for establishing access thereof to the common apparatus for a requisite time, which switching means on subsequent restoration thereof to normal extends the control signal towards any equipments of lower priority in the batch.

3. An arrangement as claimed in claim 2 wherein the control signal is made available only in response to an operated condition of the storage means of at least one of said equipments.

4. An arrangement as claimed in claim 2 including, in respect of each equipment, a demand contact operable by the equipment to indicate that it requires access to the common apparatus, bi-stable storage means capable of being changed from an initial condition to an operated condition consequent on operation of the demand contact, a control lead, and two further contacts operated consequentially on such change of the storage means, the one to render the demand contacts for all the storage means thereafter ineffectual while the other, having a series connection extended to it from said control lead through the corresponding contacts, when unoperated, for the equipments of higher priority, operates to apply a marking from the control lead to the related equipment as a signal for establishing access between that equipment and the common apparatus, the storage means and its consequentially operated contacts being restored to their unoperated condition when the equipment has finished with the common apparatus.

5. An arrangement as claimed in claim 4 wherein the storage means provided in respect of the several equipments have further consequentially operated contacts co-operating with each other to mark the control lead only when at least one of the storage means is in its operated condition.

6. An arrangement as claimed in claim 4 wherein each storage means is constituted by a self-holding relay which is governed by the demand contact and has a repeater relay associated therewith, the said consequentially operated contact for which applies the control lead marking to the relevant equipment being provided on the self-holding relay and the other said consequentially operated contact being provided on the repeater relay.

7. An arrangement as claimed in claim 6 wherein the repeater relays associated with the storage means self-holding relays for the several equipments have respective additional contacts co-operating with each other to mark the control lead only when at least one of these repeater relays is in its operated condition.

8. An arrangement for controlling the access of a number of equipments one at a time, in batches, to a common apparatus, which arrangement comprises, in respect of each said equipment, a demand contact operable by the equipment to indicate that it requires access to the common apparatus, a stick relay having a pick-up winding connected in an energising circuit therefor in series with the demand contact, and a hold-on winding connected in an energising circuit including also, in series, a front contact of the relay and a demand-satisfied contact operable by the equipment to indicate that it has finished with the common apparatus, a common control lead, a signal lead connectible to the common control lead over a connection including a switching contact of the self-holding relay in its front position and the corresponding switching contacts in their back positions of the self-holding relay for any equipments of higher priority, and a repeater relay connected for energisation contemporaneously with the hold-on winding of the self-holding relay, which repeater relay has a first contact connected in its back position, in series with corresponding first contacts of the other repeater relays in their back positions, in a common portion of the pick-up energising circuits for the several self-holding relays, the pick-up windings and demand contacts being in non-common portions of these energising circuits, and a second contact connected in its front position to apply a marking to said control lead by way of the corresponding second contacts, in their back positions, of the repeater relays for any equipments of lower priority.

9. In an arrangement as claimed in claim 8 wherein the marking applied to the control lead by the second contacts of the repeater relays is earth potential and wherein the common portion of the pick-up energising circuits for the self-holding relays includes a common lead to which earth potential is applied through the first contacts of the repeater relays when all in their back positions, a fault lead connected to earth on operation of any of the repeater relays, a first fault relay having two differentially connected windings of which one is connected in series with an energising source between the control lead and earth while the other is connected in series with an energising source between earth and said fault lead, and a second fault relay having two differentially connected windings of which one is connected in series with an energising source between earth and said common lead in the energising circuits for the self-holding relays, while the other is connected in series with an energising source between earth and a series connection to earth including contacts of all the repeater relays in their back positions.

References Cited in the file of this patent

UNITED STATES PATENTS

| | | |
|---|---|---|
| 2,249,486 | Molnar | July 15, 1941 |
| 2,467,457 | Balzer | Apr. 19, 1949 |
| 2,757,240 | Gatzert | July 31, 1956 |
| 2,857,472 | Judy | Oct. 21, 1958 |